(12) United States Patent
Suzuki et al.

(10) Patent No.: US 7,139,975 B2
(45) Date of Patent: Nov. 21, 2006

(54) METHOD AND SYSTEM FOR CONVERTING STRUCTURED DOCUMENTS

(75) Inventors: Hideharu Suzuki, Yokohama (JP);
Norihiro Ishikawa, Yokohama (JP);
Hidetoshi Ueno, Yokosuka (JP);
Hiromitsu Sumino, Yokosuka (JP);
Takeshi Kato, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 546 days.

(21) Appl. No.: 10/291,568

(22) Filed: Nov. 12, 2002

(65) Prior Publication Data
US 2003/0093760 A1    May 15, 2003

(30) Foreign Application Priority Data
Nov. 12, 2001   (JP)   .............. 2001-346736

(51) Int. Cl.
*G06F 15/00* (2006.01)

(52) U.S. Cl. ................... 715/513; 715/500
(58) Field of Classification Search ........... 715/501.1, 715/513, 500, 514
See application file for complete search history.

(56) References Cited

U.S. PATENT DOCUMENTS

| | | | | | |
|---|---|---|---|---|---|
| 5,299,304 | A | * | 3/1994 | Williams et al. ............ 715/523 |
| 5,491,628 | A | * | 2/1996 | Wakayama et al. ............ 704/9 |
| 5,752,021 | A | * | 5/1998 | Nakatsuyama et al. ........ 707/5 |
| 5,915,259 | A | * | 6/1999 | Murata ....................... 715/513 |
| 5,920,879 | A | * | 7/1999 | Kyojima et al. ............. 715/517 |
| 6,115,686 | A | * | 9/2000 | Chung et al. ............... 704/260 |
| 6,182,092 | B1 | * | 1/2001 | Francis et al. .............. 715/513 |
| 6,336,124 | B1 | | 1/2002 | Alam et al. |
| 6,424,980 | B1 | * | 7/2002 | Iizuka et al. ............... 715/513 |
| 6,502,112 | B1 | * | 12/2002 | Baisley ...................... 715/513 |
| 6,598,091 | B1 | * | 7/2003 | Yoo et al. ................... 709/246 |
| 6,681,223 | B1 | * | 1/2004 | Sundaresan ................... 707/6 |
| 6,694,338 | B1 | * | 2/2004 | Lindsay ...................... 707/203 |
| 6,848,078 | B1 | * | 1/2005 | Birsan et al. ............... 715/511 |
| 6,848,079 | B1 | * | 1/2005 | Ito ............................ 715/523 |
| 6,964,013 | B1 | * | 11/2005 | Ono et al. ................... 715/513 |
| 7,069,497 | B1 | * | 6/2006 | Desai ....................... 715/501.1 |
| 2002/0059344 | A1 | | 5/2002 | Britton et al. |
| 2002/0065109 | A1 | * | 5/2002 | Mansikkaniemi et al. .. 455/566 |
| 2002/0073119 | A1 | | 6/2002 | Richard |
| 2002/0143727 | A1 | * | 10/2002 | Hu et al. ...................... 707/1 |
| 2002/0184263 | A1 | * | 12/2002 | Perinet et al. .............. 707/513 |
| 2002/0194227 | A1 | * | 12/2002 | Day et al. ................... 707/523 |

(Continued)

FOREIGN PATENT DOCUMENTS

JP      07-200550      8/1995

(Continued)

OTHER PUBLICATIONS

Floyd, Dynamically generated XSL revisited, Web Technique, Mar. 2001, vol. 6, pp. 1-5, ProQuest.*

(Continued)

*Primary Examiner*—Cong-Lac Huynh
(74) *Attorney, Agent, or Firm*—Oblon, Spivak, Maier & Neustadt, P.C.

(57) ABSTRACT

A document conversion method for converting a first structured document F1, formed based on a first document type definition D1, to a second structured document F3, formed based on a second document type definition D2, the document conversion method including analyzing the document type definition D1 and document type definition D2 and extracting a difference document type definition, generating a conversion template T2 described therein a conversion rule which prevents the structured document F3, which is the result of document conversion process, from being contradictory to the document type definition D2, based on the results of the analysis, and performing document conversion process using the conversion template T2.

18 Claims, 14 Drawing Sheets

| IDENTIFIER CORRESPONDENCE TABLE | | CONVERSION RULE | | | |
|---|---|---|---|---|---|
| FIRST IDENTIFIER | SECOND IDENTIFIER | CONDITION | | | CONTENT OF CONVERSION |
| UL ELEMENT | ul ELEMENT | CONDITION 1 | QUANTITY OF li ELEMENTS TO BE SUB-ELEMENTS (N) | N<2 | <ul>...</ul> |
| | | CONDITION 2 | | N≧2 | <ul><li>...</li></ul> |
| BODY ELEMENT | body ELEMENT | CONDITION 1 | IN CASE TAG FOLLOWS | | <body>...</body> |
| | | CONDITION 2 | IN CASE TEXT FOLLOWS | | <body><div>...</div></body> |
| BLOCKQUOTE ELEMENT | blockquote ELEMENT | CONDITION 1 | IN CASE TAG FOLLOWS | | <blockquote>...</blockquote> |
| | | CONDITION 2 | IN CASE TEXT FOLLOWS | | <blockquote><div>...</div></blockquote> |
| OL ELEMENT | ol ELEMENT | CONDITION 1 | QUANTITY OF li ELEMENTS TO BE SUB-ELEMENTS (N) | N=0 | <div>...</div> |
| | | CONDITION 2 | | N≧1 | <ol>...</ol> |

U.S. PATENT DOCUMENTS

| | | | |
|---|---|---|---|
| 2003/0131134 A1* | 7/2003 | Lewis | 709/246 |
| 2003/0145305 A1* | 7/2003 | Ruggier | 717/100 |
| 2003/0167445 A1* | 9/2003 | Su et al. | 715/513 |
| 2004/0181748 A1* | 9/2004 | Jamshidi et al. | 715/503 |
| 2004/0216030 A1* | 10/2004 | Hellman et al. | 715/500 |
| 2005/0210414 A1* | 9/2005 | Angiulo et al. | 715/838 |
| 2006/0095836 A1* | 5/2006 | Ono et al. | 715/513 |

FOREIGN PATENT DOCUMENTS

| | | |
|---|---|---|
| JP | 11-212961 | 8/1999 |
| JP | 2002-259362 | 9/2002 |
| KR | 2000-0053638 | 8/2000 |

OTHER PUBLICATIONS

Fan et al., A Unified Constraint Model for XML, ACM 2001, pp. 179-190.*

Villard et al., An Incremental XSLT Transformation Processor for XML document Manipulation, ACM 2002, pp. 474-485.*

Su et al., Automating the Transformation of XML Documents, ACM 2001, pp. 68-75.*

M. Murata, Presented at SGML/XML '97 Conference Proceedings, pp. 1-12, XP-002234631, "DTD Transformation by Patterns and Contextual Conditions", Dec. 8, 1997.

F. Bendeck, Tenth IEEE International Workshops on Enabling Technologies: Infrastructures for Collaborative Enterprises, pp. 1-6, XP-010559003, "Automation of XML Documents Translators Generation", Jun. 20-22, 2001.

A. Brüggemann-Klein, et al., Markup Languages: Theory & Practice, vol. 1, No. 2, pp. 81-106, XP-002234632, "Caterpillars: A Context Specification Technique", 2000.

Tova Milo, et al., "Using Schema Matching to Simplify Heterogeneous Data Translation", Proceedings of the 24th VLDB Conference, 1998, pp. 122-133.

Jayant Madhavan, et al., "Generic Schema Matching with Cupid", Proceedings of the 27th VLDB Conference, Sep. 11-14, 2001, pp. 49-58.

R. Depke, et al.; "A Concept for Generating XSL Transformations and Their Application for Self-Service Banking Systems"; pp. 1-12; XP-002234630; Veroffentlicht in: Tagungsband Net.ObjectDays 2000; ISBN 3896839322; Erfurt, Germany; Oct. 2000.

* cited by examiner

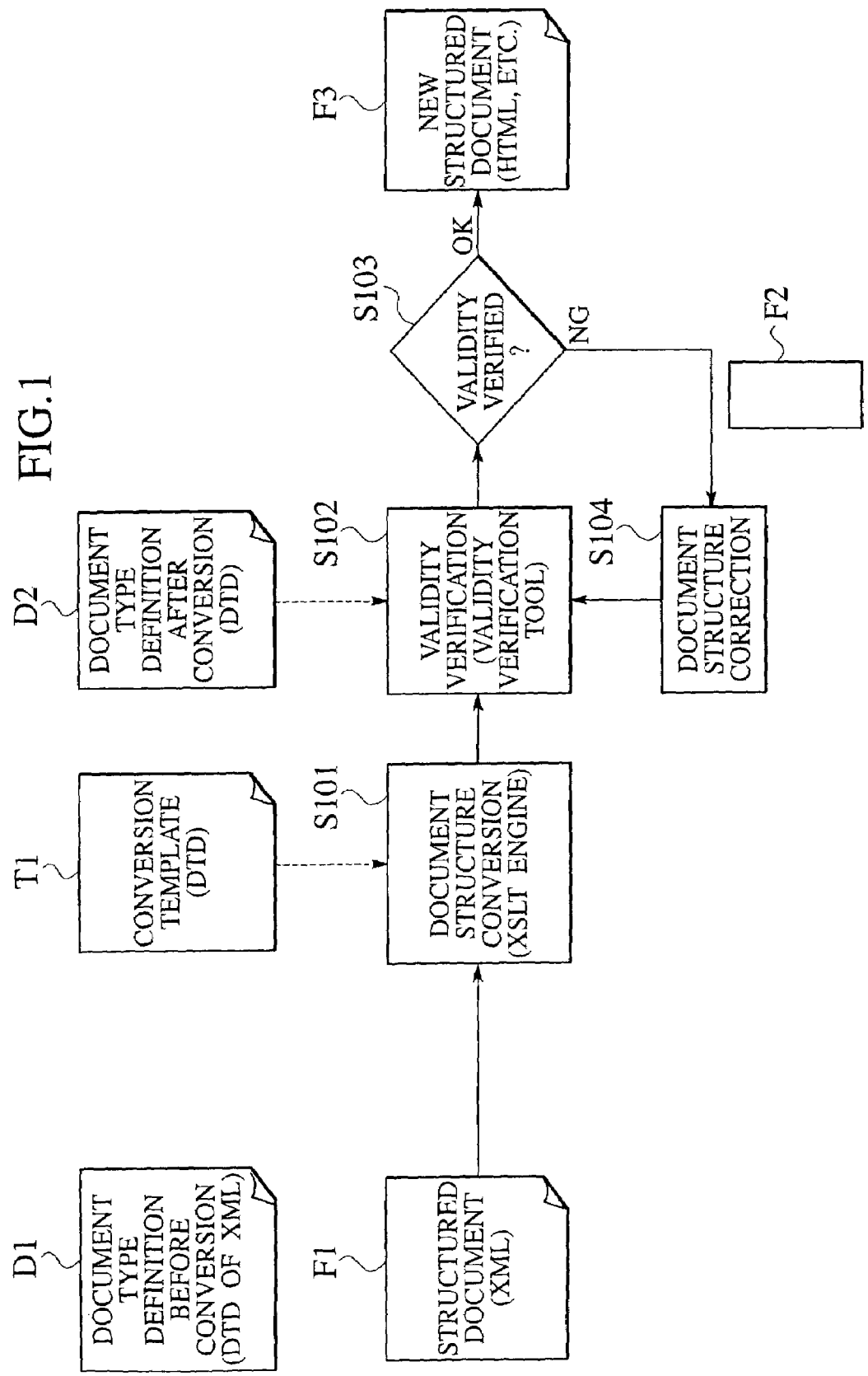

FIG.2A (DOCUMENT BEFORE CONVERSION)                                F1

```
<UL>
        <LI>John</LI>
        <LI>Micheal</LI>
        <LI>Paul</LI>
</UL>
```

(DOCUMENT AFTER CONVERSION (i)
CONTAINING CONTRADICTIONS)                                  F2

```
<ul>
        <li>John</li>
        <li>Micheal</li>            (iii)
        <li>Paul</li>
</ul>
```

(DOCUMENT AFTER CONVERSION
IN WHICH CONTRADICTIONS ARE (ii)                            F3
CORRECTED)

```
<ul>
        <li>John</li>
</ul>
<ul>
        <li>Micheal</li>
</ul>
<ul>
        <li>Paul</li>
</ul>
```

```
<xsl:template match="UL">          (1)
        <ul>
        <xsl:apply-templates select="LI"/>     (2)
        </ul>
</xsl:template>

<xsl:template match="LI">          (3)
        <li><xsl:value-of select="."/></li>    (4)
</xsl:template>
```

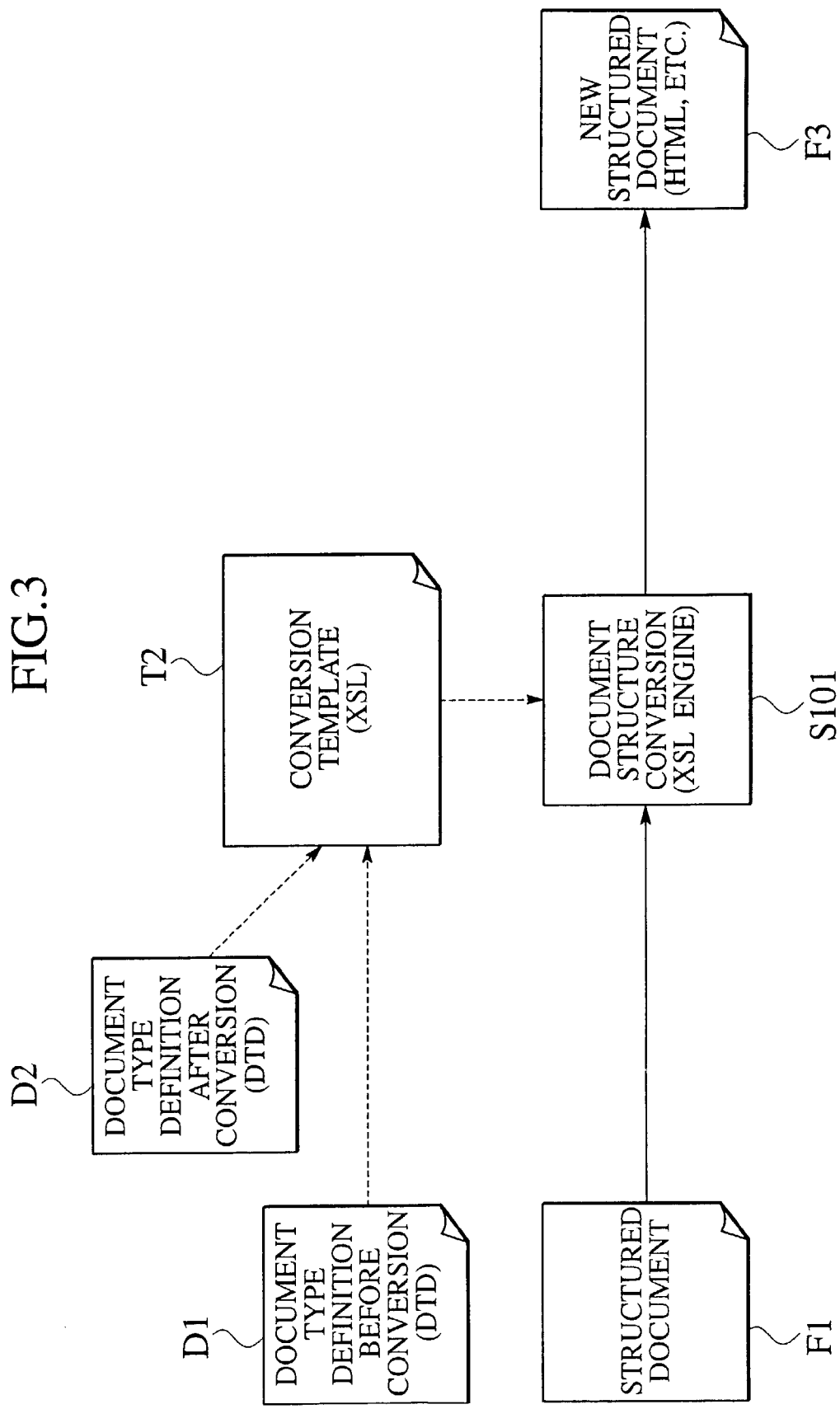

FIG.5A

F31 (DOCUMENT BEFORE CONVERSION)

```
<BODY>
World Wide Web
    <BLOCKQUOTE>
        DEVELOPED BY CONSEIL EUROPEENNE POUR LA REAHERCHE NUCLEAIRE (CERN) AND
        HIGH-LEVEL INFORMATION FOR PROCESSING MULTIMEDIA DATA CAN BE PROVIDED.
    </BLOCKQUOTE>
</BODY>
```

(iv) →

F32 (DOCUMENT AFTER CONVERSION CONTAINING CONTRADICTIONS)

```
<body>
World Wide Web
    <blockquote>
        DEVELOPED BY CONSEIL EUROPEENNE POUR LA REAHERCHE NUCLEAIRE (CERN) AND
        HIGH-LEVEL INFORMATION FOR PROCESSING MULTIMEDIA DATA CAN BE PROVIDED.
    </blockquote>
</body>
```

(v) →

(vi) →

F33 (DOCUMENT AFTER CONVERSION IN WHICH CONTRADICTIONS ARE CORRECTED)

```
<body> <div>
    <blockquote> <div>
        DEVELOPED BY CONSEIL EUROPEENNE POUR LA REAHERCHE NUCLEAIRE (CERN) AND
        HIGH-LEVEL INFORMATION FOR PROCESSING MULTIMEDIA DATA CAN BE PROVIDED.
    </div> </blockquote>
</div> </body>
```

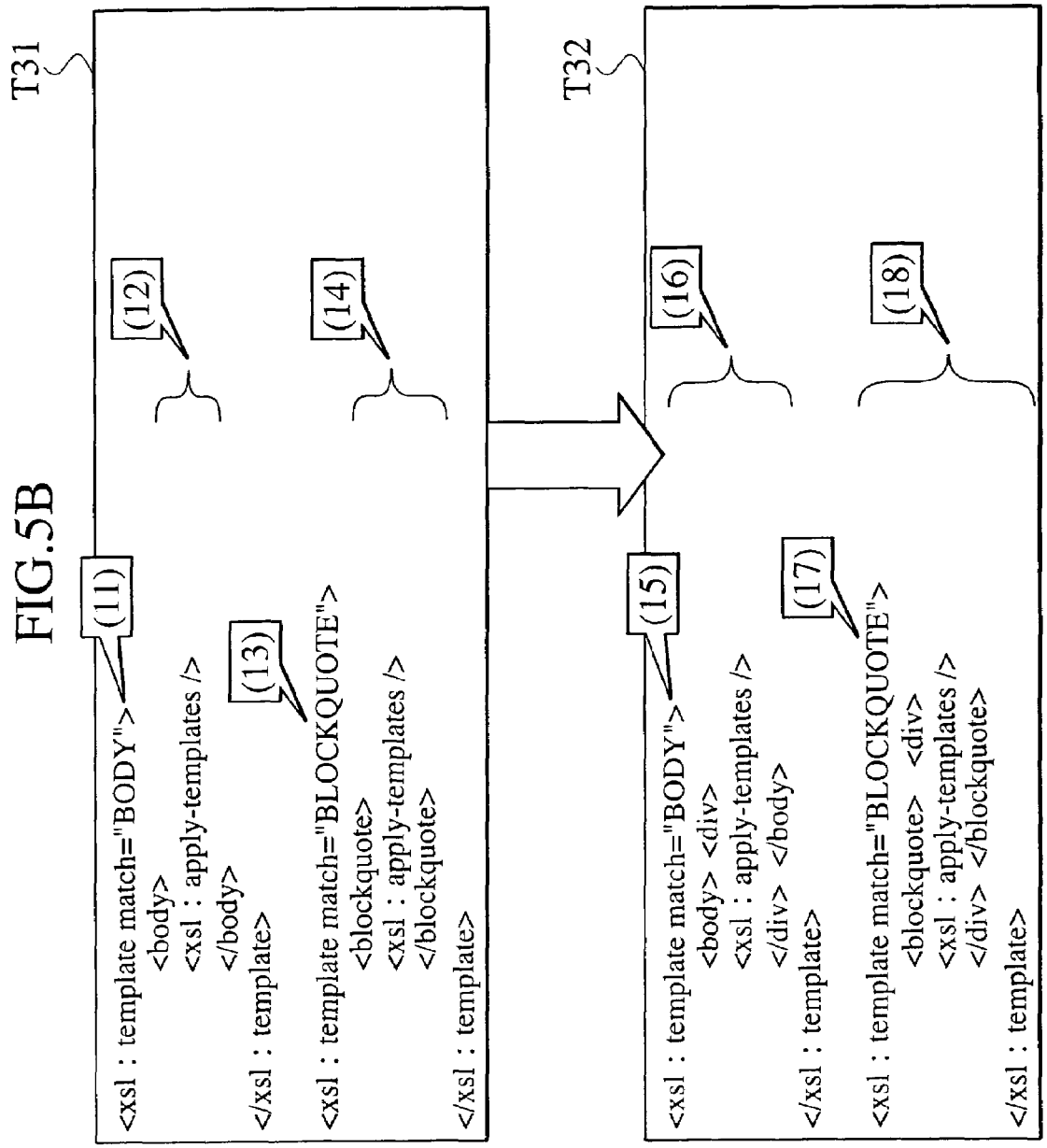

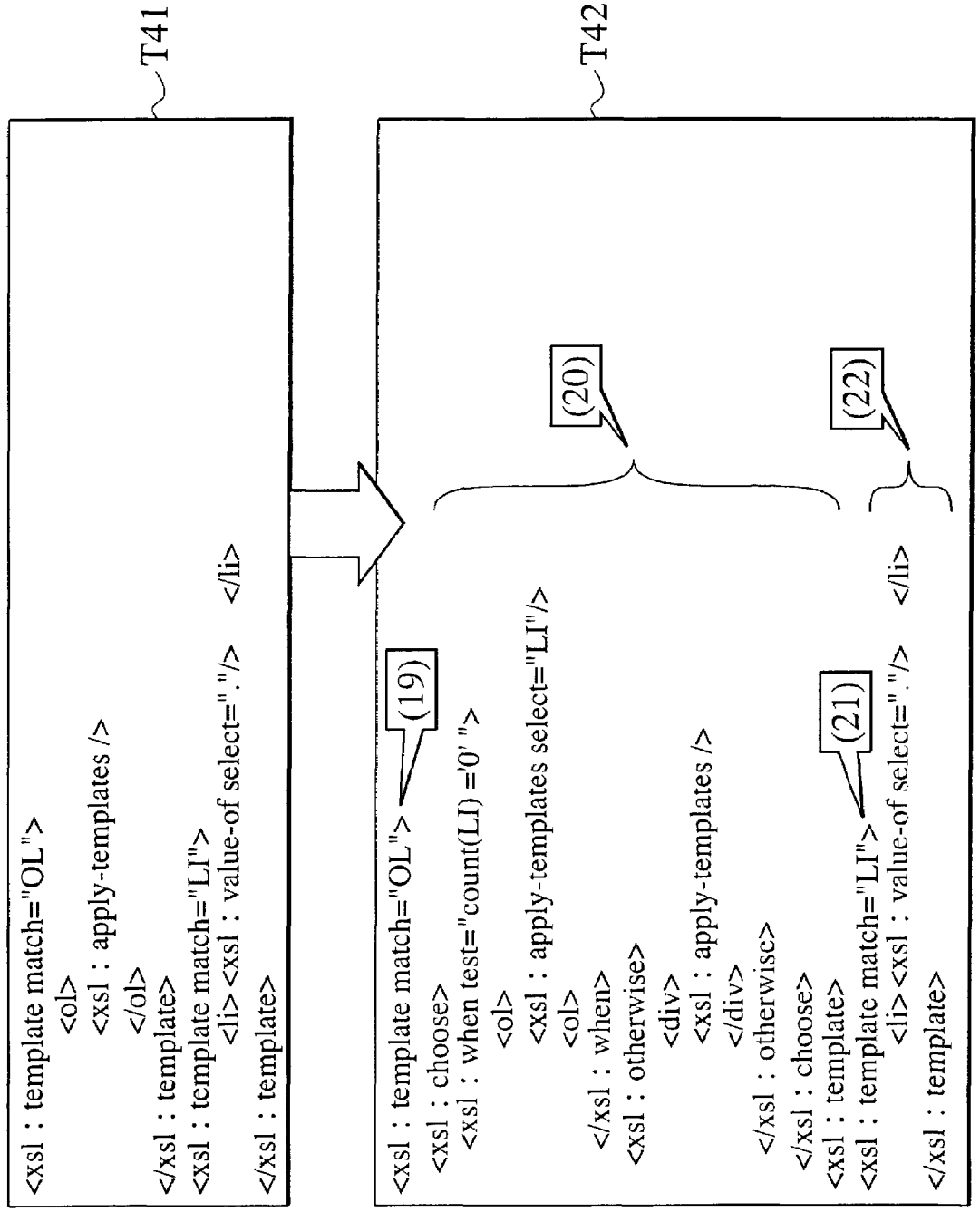

FIG. 13

| IDENTIFIER CORRESPONDENCE TABLE | | CONVERSION RULE | | | |
|---|---|---|---|---|---|
| FIRST IDENTIFIER | SECOND IDENTIFIER | CONDITION | | | CONTENT OF CONVERSION |
| UL ELEMENT | ul ELEMENT | CONDITION 1 | QUANTITY OF li ELEMENTS TO BE SUB-ELEMENTS (N) | N<2 | `<ul>...</ul>` |
| | | CONDITION 2 | | N≧2 | `<ul><li>...</li></ul>` |
| BODY ELEMENT | body ELEMENT | CONDITION 1 IN CASE TAG FOLLOWS | | | `<body>...</body>` |
| | | CONDITION 2 IN CASE TEXT FOLLOWS | | | `<body><div>...</div></body>` |
| BLOCKQUOTE ELEMENT | blockquote ELEMENT | CONDITION 1 IN CASE TAG FOLLOWS | | | `<blockquote>...</blockquote>` |
| | | CONDITION 2 IN CASE TEXT FOLLOWS | | | `<blockquote><div>...</div></blockquote>` |
| OL ELEMENT | ol ELEMENT | CONDITION 1 | QUANTITY OF li ELEMENTS TO BE SUB-ELEMENTS (N) | N=0 | `<div>...</div>` |
| | | CONDITION 2 | | N≧1 | `<ol>...</ol>` |

METHOD AND SYSTEM FOR CONVERTING STRUCTURED DOCUMENTS

CROSS REFERENCE TO RELATED APPLICATIONS

This application is based upon and claims the benefit of priority from the prior Japanese Patent Applications No. P2001-346736, filed on Nov. 12, 2001; the entire contents of which are incorporated herein by reference.

BACKGROUND OF THE INVENTION

1. Field of the Invention

The present invention relates to a document conversion system for converting a first structured document formed by a first document schema to a second structured document formed by a second document schema, a document conversion method and a computer readable recording medium storing a document conversion program.

2. Description of the Related Art

Conventionally, the structured document which not only handles text data of text document files as mere character string but also is capable of expressing the logical structure of the document layout, attributes, etc. has been proposed. For example, SGML specified by International Standardization Organization (ISO) standard 8879 and XML specified by World Wide Web consortium (W3C) are currently available. According to the SGML and XML, the logical structure of a document is specified by document type definition (DTD) and the roles of document component elements such as title, author's name, preface and text can be expressed using identifier for structure elements called document tag.

In the structured document, specific meaning or role, etc. may need to be assigned to the identifier and additional information (attributes) can be added to the identifier to express this characteristic.

Further, the format of the stylesheet for describing the style of document, which is required for displaying the structured document on the screen and printing the structured document on paper, has been proposed. As the format of the stylesheet, for example, specification language (DSSSL) of ISO standard 10179 and extensible stylesheet language (XSL) specified by W3C are available.

DSSSL and XSL describe the document style by specifying a pattern for expressing the condition for the identifier constituting SGML or XML and an action corresponding to the identifier which satisfies that pattern.

The stylesheet provides the document style and converts the structure of the document. The specification for extracting a particular pattern of the structured document in XSL is called XSL transformation (XSLT). The use of the XSLT enable the XML document to be converted according to predetermined conditions and outputted in a different format such as HTML for example.

The structured document is produced by dividing document data (text) into units which have a meaning structurally and make these units using elements and attributes. In XML, the method for defining the structure of the document data is called schema and generally, document type definition (DTD) is used for defining the schema. The schema defines which elements should be possessed in what order and how many times as the content of the document and which attributes should be possessed as the content of the document. Since the structured document itself has no definition about data, it cannot automatically check for an error even if data is missing for some reason. Thus, document type definition is to be performed to display data or exchange data and the document needs to be described according to the definition.

FIG. 1 shows an example flow of a conventional document conversion process for the structured document F1 which is described by the XML. As shown in the figure, generally, the conversion process of the structured document is comprised of 2 steps, that is mainly conversion of document structure S101 and its validity verification process S102.

The conversion of document structure S101 is a step of generating a new document by extracting elements and attributes using a pattern matching technique and replacing them with new elements and attributes or by adding new elements, attributes and text. This process is performed based on a conversion rule described in a conversion template T1. The conversion template T1 contains a structure conversion rule which is generated as an XSL file (conversion template T1) in advance. In the meantime, as the XSLT conversion engine for the conversion of document structure process S101, the existing software (e.g., Xalan-C++) can be utilized.

The validity verification process S102 is a step of verifying whether the output (structured document F2) by the XSLT conversion process follows a document type definition D2 after conversion and is performed using the document type definition D2 after conversion. The validity verification process S102 can be performed by the existing software (e.g., XML4C). If the result of the validity verification process S102 is acceptable, a new structured document F3 is generated. If it is not acceptable, document structure correction process S104 is performed for the structured document F2 based on the error content, and the validity verification process S102 is again performed for the corrected structured document F2.

FIG. 2A is a diagram showing a conventional example for converting the structured document F1 defined by the document type definition D1 to the structured document F3 based on the conversion template T1. In the figure, the structured document F2 after a first conversion (i) is contradictory to the document type definition D2, and the structured document F3, in which the contradictions are corrected. In a document example of FIG. 2A, UL element and ul element define a statement row without any number (list in random order) and each statement item is defined with LI element and li element which are lower order of UL and ul elements.

As the element after the conversion, the ul element and li element correspond to the UL element and LI element. In the structured document F1, a list comprising three statements is described. In the structured document F2 containing contradictions, simply corresponding elements are replaced.

If such a rule that only one li element can be defined under the ul element is specified in the document type definition D2, each li element is to be a sub-element of ul element (each li element is enclosed by ul tag) in the structured document F2. Consequently, it is corrected to an appropriate structured document F3 which satisfies the document type definition D2.

FIG. 2B is an example of a description of a conventional conversion template T1. As shown in the figure, the conversion template T1 acts as a conversion rule about conversion from the structured document F1 to the structured document F2 (i) containing contradictions.

The conversion template T1 is comprised of a pattern assigning part and a template assigning part.

Through conversion process, a document pattern (tag) defined by the pattern assigning part is extracted from the structured document. Further, addition, deletion and replacement are performed to the extracted document pattern according to the template assigning part in order to generate a new document.

In the conventional conversion template T1, each of <xsl:template match>, <xsl:apply-template>, <xsl:value-of> is an element defined by the XSL specification.

(1) and (3) using <xsl:template match> mean specifying the pattern and (1) means extraction of the UL element while (3) means extraction of the LI element. (2) and (4) mean specifying the template. The UL element is extracted according to the pattern specifying of (1) and then the template of (2) is specified.

The specifying template of (2) means describing the start tag of ul and describing the termination tag of ul after process of applying a template rule to the LI element is performed. The template rules for the LI element are (3) and (4), and the LI element is extracted according to the pattern specifying of (3). Further, as the template specifying of (4), the start tag of li is described, a portion under the LI element is converted to text and finally the termination tag of li is described. Since there are three LI elements in the structured document F1, three portions corresponding to the pattern specifying of the above (3) are extracted. Further, the template specifying of (4) is applied respectively and then the process is complete.

However, as described above, in a case where the document type definition D1 contains a contradiction with the document type definition D2 (e.g., specification which is inhibited in the document type definition D2 ), if only extracting elements/attributes according to the conversion template T1 and replacing (converting) to corresponding elements/attributes or adding such elements/attributes is performed, a contradiction with the document type definition D2 remains.

According to the conventional structured document conversion method, both the document structure conversion process S101 and the validity verification process S102 search elements/attributes from a route element to an end element in the document data. Therefore, there is a problem that the conversion of document takes longer time as the required times of the document correction process S104.

Further, there is a problem that if a result of the validity verification process S102 is not acceptable, an operator must manually perform a document correction process S104 in an off-line state based on the result of the validity verification process S102.

BRIEF SUMMARY OF THE INVENTION

It is therefore an object of the present invention to reduce a total time required for document conversion by outputting an appropriate document data which matches a document type definition after conversion so as to omit a validity verification step in the document structure conversion.

The present invention has a feature of, upon converting a first structured document formed based on a first document schema into a second structured document formed based on a second document schema, analyzing the first document schema and the second document schema and extracting a different document type definition, generating a conversion template having described therein a conversion rule which prevents the second structured document, which is the result of a document conversion process, from being contradictory to the second document schema, based on the result of the analysis, and performing document conversion process using the conversion template.

According to the present invention, if there is an output logic which does not satisfy the document type definition after conversion (second document schema), reflecting a process for correcting a contradiction with a conversion template, the second structured document which is a result of the document structure conversion process can be made appropriately according to the document type definition after conversion. As a result, a validity verification step after conversion, which is performed conventionally, can be omitted, thereby reducing a total time required for the document conversion.

BRIEF DESCRIPTION OF THE SEVERAL VIEWS OF THE DRAWINGS

FIG. 1 is a schematic diagram showing the outline of a conventional document conversion method;

FIGS. 2A and 2B are diagrams showing an example of generation of a conventional conversion template;

FIG. 3 is a schematic diagram showing the outline of a document conversion method of an embodiment of the present invention;

FIGS. 5A and 5B are diagrams showing an example of generation of other conversion template of the embodiment of the present invention;

FIGS. 6A and 6B are diagrams showing an example of generation of other conversion template of the embodiment of the present invention;

FIG. 13 is a table showing the identifier correspondence table and conversion rule relating to the embodiment of the present invention.

DETAILED DESCRIPTION OF THE INVENTION

Document Conversion Method

Figure 4A:
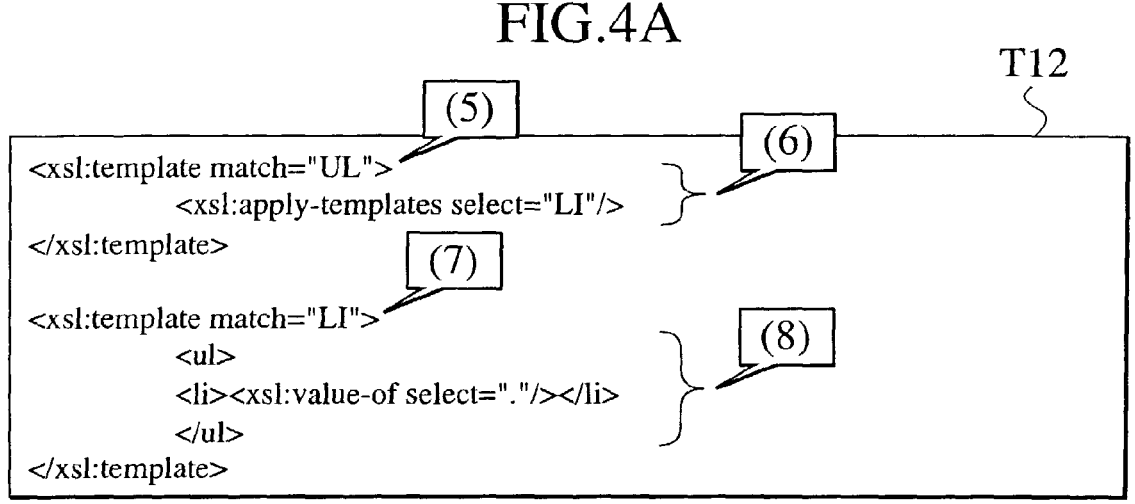
FIGS. 4A and 4B are diagrams showing an example of description of the conversion template according to the embodiment of the present invention.

Hereinafter, the embodiments of a document conversion method of the present invention will be described. FIG. 3 is a schematic diagram showing the outline of the document conversion method of this embodiment.

As shown in the figure, a conversion template T2 contains description of an appropriate conversion rule based on interpreting a document type definition D1 (first document schema) which is applied before the conversion and a document type definition D2 (second document schema)

which is applied after the conversion for outputting a result according to the document type definition D2. In a document structure conversion process S101, the document structure of a structured document F1 (first structured document) which is a document before conversion is converted according to the description of the conversion template T2 in order to generate a new structured document F3 (second structured document).

Such a conversion template T2 can be generated by the following procedure. In the meantime, according to this embodiment, the document type definition D1 and the document type definition D2 are document data having an identifier (mark tag) for defining the logical structure of a character string of the document such as XML and HTML.

Here, an identifier correspondence table and conversion rule are generated. FIG. 13 is a table which shows the identifier correspondence table and conversion rule relating to this embodiment.

As shown in FIG. 13, the identifier correspondence table is a table which indicates the relationship between the elements for defining the same logical structure like the UL element and the ul element. The conversion rule is comprised of a replaceable template for defining the logical structure after conversion and the conditions for adapting the template.

The identifier correspondence table is generated based on the relationship between elements expressed in capital letters and small letters or elements using arguments having the same content or elements having the same function. Following this identifier correspondence table, the logical structures before and after conversion are compared and portions that differ between them are detected. For example, as shown in FIG. 2, the document type definition of the logical structure formed of the UL element and LI element in the structured document F1 and the document type definition of the logical structure formed of the ul element and li element in the structured document F3 are compared so as to detect differing portions.

Further, the conditions of these detected differing portions are analyzed. According to an example shown in FIG. 2A, if there are plural LI elements (two or more), the UL element is nested with respect to each LI element. Therefore, in this example, (LI>=2) is adapted as the condition. Then, a conversion rule is generated based on the conditions of the differing portions and the corresponding logical structure after conversion, and the conversion rule is reflected on the conversion template T2.

According to this embodiment, the conversion template T2 is comprised of pattern specifying and template specifying. The pattern is for specifying an identifier to be converted. Here, an identifier described in the identifier correspondence table is the said identifier. The template specifying the conversion rule in FIG. 13 is reflected and comprised of a template for replacing which defines the logical structure after the conversion, and the condition for adapting the replaceable template.

Figure 4B:
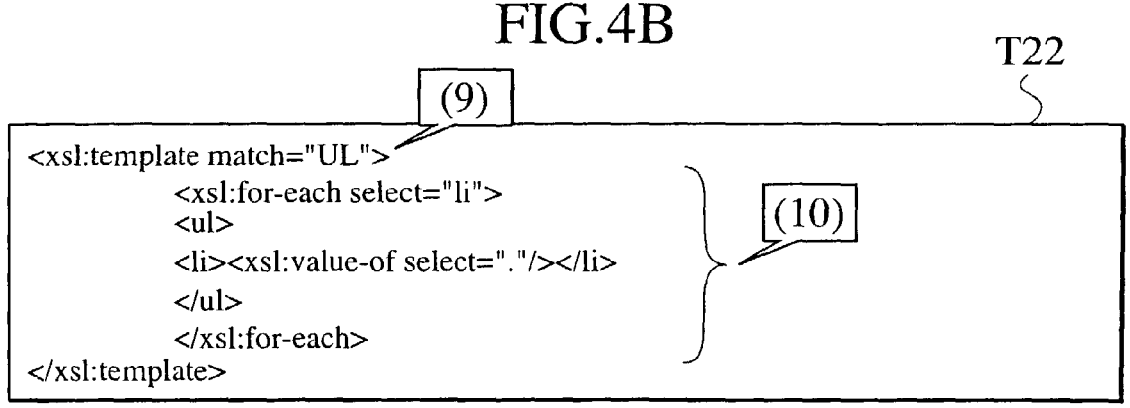

FIGS. 4(a) and 4(b) show the template rules T12, T22 as an example of description of the conversion template T2 of this embodiment. The example corrects the contradiction shown in FIG. 2 and the structured document F3 is outputted by a single conversion (FIG. 2(iii)). According to the template rule T12 of this embodiment, (5) and (7) indicate the pattern specifying. (5) describes the extraction of the UL element, while (7) describes the extraction of the LI element. Further, (6) and (8) describe template specifying.

In the example shown in FIG. 4A, firstly, the UL element is extracted and the template of (6) is specified according to the pattern specifying of (5). The template specifying of (6) means shifting an object which a template is to be adapted from a current element (UL) to a sub-element (LI). The template rule for the LI element is indicated by (7), (8).

Next, the LI element is extracted by the pattern specifying of (7). Then, by the template specifying of (8), the start tag for ul is described, the start tag for li is described, a portion following the LI element is converted to text and described. Finally, the end tags of li and ul are described.

Since the structured document F1 before conversion has three LI elements as shown in FIG. 3, three portions corresponding to the pattern specifying of (7) are extracted and the process of the template specifying of (8) is performed so as to complete the process of conversion.

According to the template rule T22 shown in FIG. 4B, <xsl:for-each> is one of elements defined by the specification of XSL. (9) means the pattern specifying, which specifies the extraction of the UL element. (10) means the template specifying, which specifies repeated process of plural LI elements. As for the content of the process, the start tag for ul is described, the start tag for li is described, a portion following the LI element is converted to text and described and then, the end tags for li and ul are described. Since the structured document F1 contains three LI elements, the process by <xsl:for-each> element in the template specifying of (10) is repeated for the three elements and then, the process is complete.

Next, an example of another conversion template will be described. FIGS. 5(a), (b) are diagrams showing an example of conversion of the body element and blockquote element. FIG. 5A shows the structured document F31 (first structured document) which is a document before the conversion, the structured document F32 which is a document after the conversion containing contradictions, and structured document F33 (second structured document) in which the contradiction is corrected. FIG. 5B shows a conventional conversion template T31 and the conversion template T32 of this embodiment.

In the example document, the body element and BODY element indicate the main body of a document, and the blockquote element and BLOCKQUOTE element specify displaying block of character string for quotation. Although a div element specifies a block, to which the stylesheet is adapted, the stylesheet does not always have to be adapted.

According to this embodiment, as shown in the FIG. 13, the div element is used as an element capable of containing the body element and blockquote element. According to this embodiment, before and after conversion, the body element and blockquote element correspond to BODY element and BLOCKQUOTE element respectively.

The structured document F31 indicates a character string below the BODY element as a document main body and further, the structured document F31 indicates a character sting block below the BLOCKQUOTE element as quotation. The structured document F32 containing the contradictions simply replaces corresponding elements.

In the document type definition D2, if a rule that a character string cannot be described directly below the body element and blockquote element is specified, the structured document F32 is contradictory to the document type definition D2. The structured document F33 corrects that contradiction in the structured document F32 to satisfy the document type definition D2 by placing the div element to each of the body element and the blockquote element.

FIG. 5B is an example of description of the conversion template rule. The conventional conversion template rule T31 describes the conversion template rule for conversion from the structured document F31 to the document F32 after conversion (iv) as shown in FIG. 5A. The corrected conversion template rule T32 describes the conversion rule for the conversion from the structured document F31 to the structured document F33 in which the contradiction is corrected (vi).

According to the conventional conversion template rule T31, (11) and (13) mean the pattern specifying, respectively and (11) specifies extraction of the BODY element, while (13) specifies extraction of the BLOCKQUOTE element. (12) and (14) mean the template specifying, respectively.

Firstly, the BODY element is extracted according to the pattern specifying of (11) and then the template of (12) is specified. Secondary, in the template of (12), the start tag for body is described and an object which the template is to adapt is shifted from the current element (BODY) to the sub-element (BLOCKQUOTE). The template specifying of (12) means that the end tag for body is described after the process of the template rule for the sub-element (BLOCKQUOTE) is performed.

The template rule for the BLOCKQUOTE element is indicated by (13) and (14). The BLOCKQUOTE element is extracted according to the pattern specifying of (13) and the template of (14) is specified. In the template of (14), the start tag for blockquote is described and an object which the template is to adapt is shifted from the current element (BLOCKQUOTE) to the sub-element. Further, the template of (14) specifies describing the end tag for blockquote after the process of the template rule for the sub-element.

According to the conventional conversion template rule T31, the BODY element and the BLOCKQUOTE element are simply converted to the body element and blockquote element.

According to the conversion template rule T32 of this embodiment, (15) and (17) mean the pattern respectively and (15) specifies extraction of the BODY element, while (17) specifies extraction of the BLOCKQUOTE element. (16) and (18) mean the template specifying respectively. Firstly, the BODY element is extracted according to the pattern specifying of (15) and then the template of (16) is specified. Secondary, in the template of (16), the start tag for body is described, the start tag for div is described, and an object which the template is to adapt is shifted from the current element (BODY) to the sub-element (BLOCKQUOTE). The template specifying of (16) means describing of the end tags for div and body as shown in FIG. 5B after the process of the template rule to the sub-element (BLOCKQUOTE) is performed.

The template rule for the BLOCKQUOTE element is indicated by (17) and (18). The BLOCKQUOTE element is extracted according to the pattern specifying of (17) and the template of (18) is specified. In the template of (18), the start tag for blockquote is described, the start tag for div is described, and an object which the template is to adapt is shifted from the current element (BLOCKQUOTE) to the sub-element. Further, the template specifying of (18) means describing the end tags for div and blockquote as shown in FIG. 5B after the process of the template rule to the sub-element is performed. By using the conversion template T32, the BODY element and the BLOCKQUOTE element are converted to the body element and blockquote element respectively and the div element can be placed in the body element and the blockquote element.

Figure 6A:
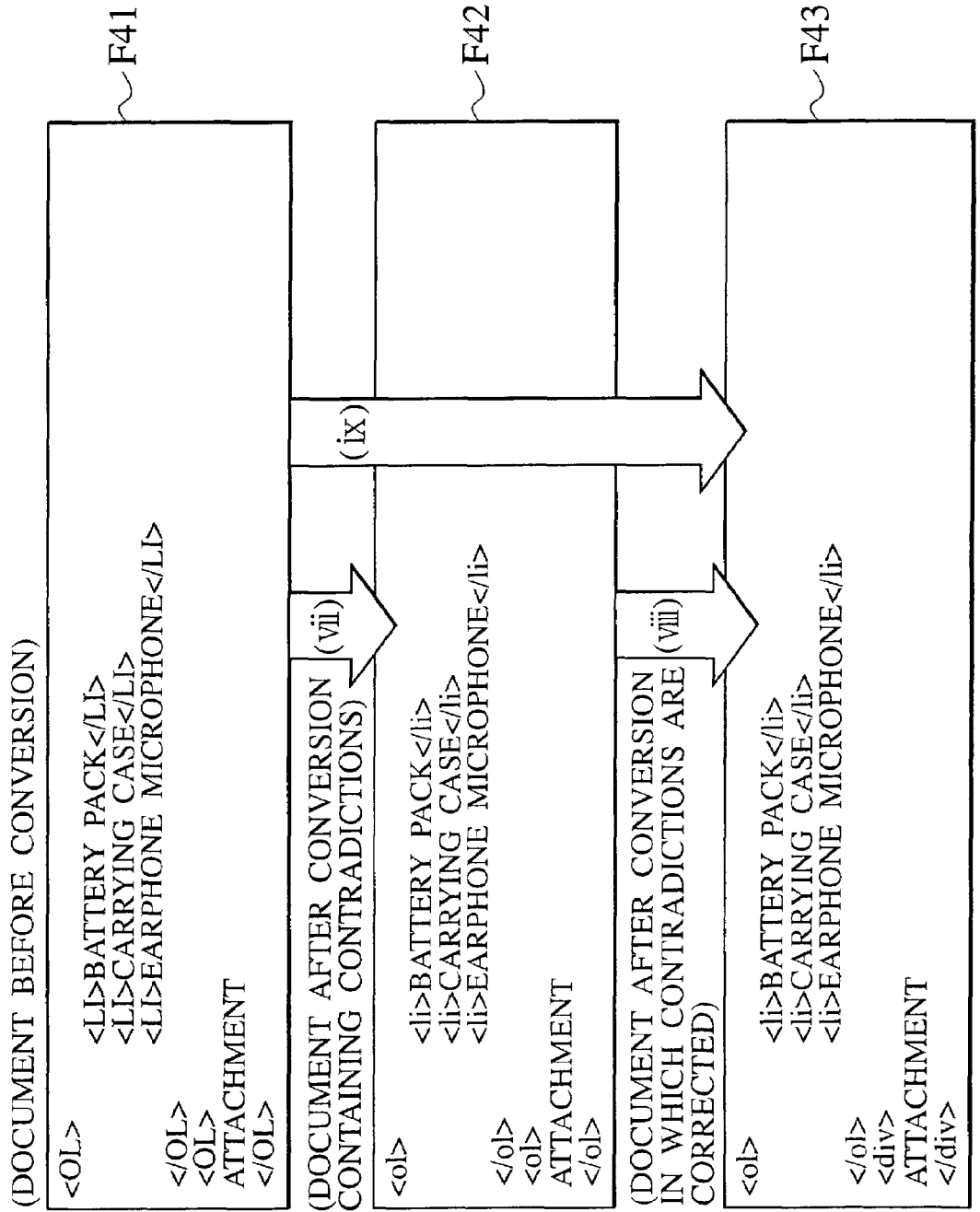

Further, an example of generating the conversion template rule T2 according to this embodiment will be described. FIGS. 6(*a*) and 6(*b*) are schematic diagrams of conversion examples with regard to the ol element and li element. FIG. 6A shows the structured document F41 which is a document before conversion (first structured document), the structured document F42 which is a document after conversion containing contradiction and the structured document F43 after conversion (second structured document) in which the contradiction is corrected. FIG. 6B shows the conventional conversion template T41 and the conversion template T42 of this embodiment.

The ol element and OL element generate numbered statement block (order list) and each statement item is defined by the li element or LI element, which is the lower level of ol or OL element. The document F41 indicates an example of both a portion in which the LI element exists and a portion in which the LI element does not exist below the OL element.

As shown in FIG. 6A, the structured document F42 containing contradictions simply replace corresponding elements. In the document type definition after conversion, if a rule that at least one li element is required below the ol element is specified, the structured document F42 is contradictory to the document type definition after conversion.

The structured document F43 corrects contradictions in the structured document F42 to satisfy the document type definition by replacing the ol element which has no li element with the div element.

FIG. 6B shows an example of the conversion template rule T42. The conventional conversion template rule T41 shown in FIG. 6B describes the conversion rule about conversion from the structured document F41 to the structured document F42 after conversion (vii) as shown in FIG. 6A. The conversion template rule T42 shown in FIG. 6B describes the conversion rule about conversion from the structured document F41 to the structured document F41 (ix).

As shown in FIG. 6, the conventional conversion template rule T41 is also comprised of the pattern for specifying extraction of the OL element/the LI element and the template corresponding to each pattern. According to this conventional conversion template rule T41, the OL element and LI element are simply converted to the ol element and li element.

According to the conversion template rule T42 of this embodiment, (19) and (21) mean the pattern specifying, respectively. (19) specifies extraction of the OL element, while (21) specifies extraction of the LI element respectively. (20) and (22) indicate the template respectively. Firstly, the OL element is extracted according to the pattern specifying of (19) and then the template of (20) is specified.

Each of <xsl:choose>, <xsl:when>, <xsl:otherwise> in FIG. 6B are elements defined by the specification of XSL. The process is performed based on a combination of these three elements. If the result of a conditional expression ("count(LI)!='0'") described in test attribute is true, the process in the element <xsl:when> is performed and if the result is false, the process in the element <xsl:otherwise> is performed.

Under the conditional expression ("count(LI)!='0'"), the quantity of the LI elements is counted and if one or more LI elements exist, the result is true. In this case, the start tag for ol is described according to the template of <xsl:when> element and then the process of the template rule to the LI element is performed. After that, the end tag of ol is described.

Further, according to the conditional expression ("count (LI)!='0'"), if the quantity of the LI elements is 0, the result is false. In this case, the start tag of div is described according to the template of <xsl:otherwise> element and then an object which the template is to adapt is shifted from the current element (OL) to the sub-element. After the process of the template rule to the sub-element is performed, the end tag of div is described. According to the conversion template rule T42, if no li element exists below the ol element, the ol element can be replaced with the div element.

Figure 7:
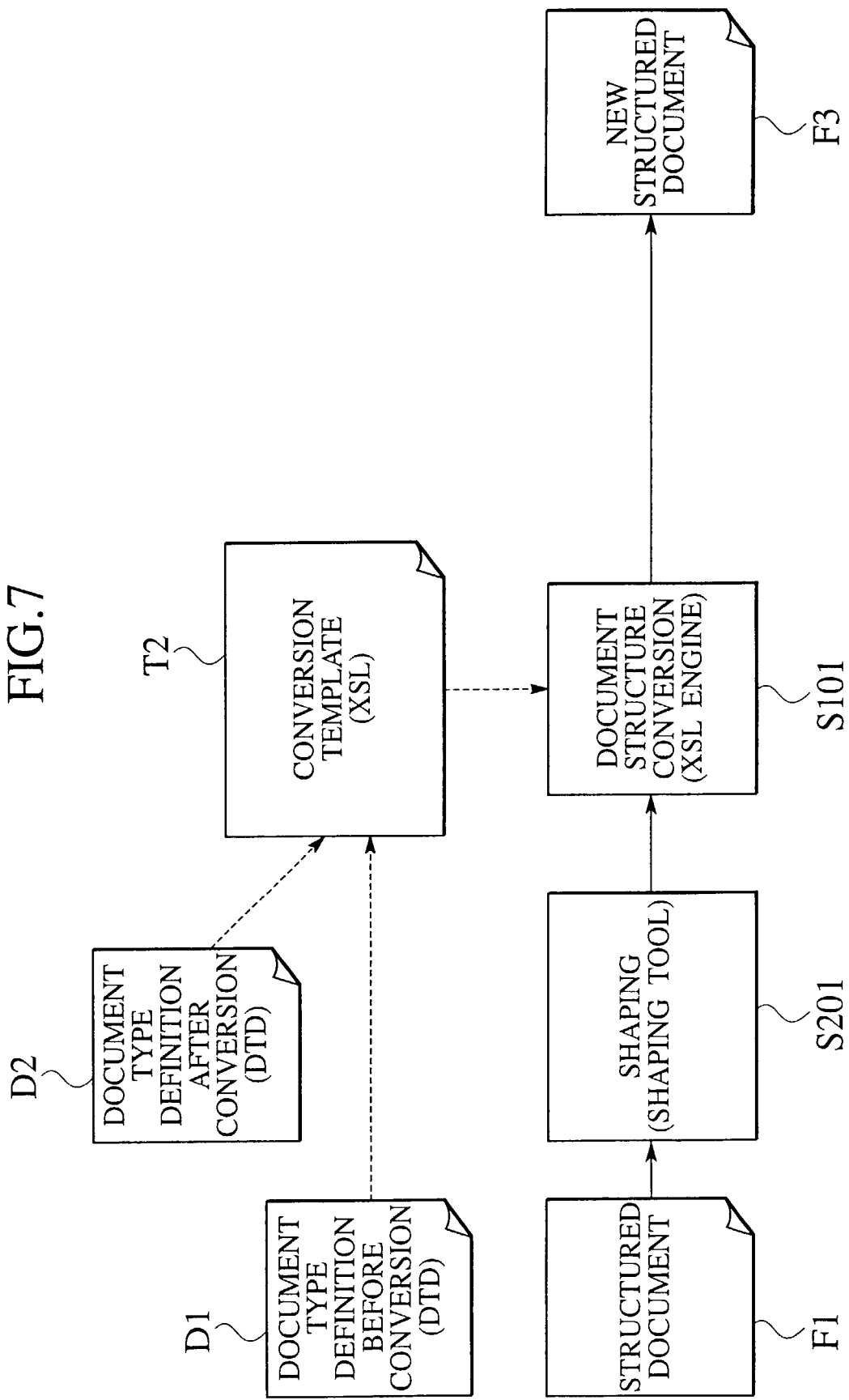
FIG. 7 is a schematic diagram showing the outline of the document conversion method according to a modification of the embodiment of the present invention.

The document conversion method of this embodiment described above allows modification as shown in FIG. 7. FIG. 7 shows an example of conversion process in a case where a structured document not following the XML, for example, compact-HTML document for i-mode (Information service for cellular phone via the Internet) is used as the structured document before conversion (first structured document). In this modification, shaping process S201 by using a shaping tool is added to the above-described embodiment.

In this example of modification, a document needs to follow the document type definition (DTD) of XML in order to activate the XSLT engine as a document structure conversion tool. The XML document needs to have a declaration statement such as XML declaration and all the elements need to be described exactly in the nesting structure. Shaping process S201 is performed in order to shape a structured document F1 which is not based on the XML to follow the specification of XML (well-formed). In the shaping process S201, the following process is performed.

The content of the process is correcting the nest of the start tag and the end tag, adding the end tag if the end tag is not attached and so on. Further, the content of the process is inserting '/' if an empty element exists (e.g., :BR//), enclosing an attribute value with double quotation, adding an attribute value if the attribute value has been omitted, correcting the element name and attribute name to small letters and so on.

As shown in FIG. 7, shaping process S201 is performed in order to shape the structured document F1 before conversion to follow the specification of XML. In the shaping process S201, free software (e.g., HTML Tidy) can be used. Document structure conversion S101 is performed to a document shaped by the shaping process S201 in order to generate a new structured document F3. The conversion template T2 describes an appropriate conversion rule by interpreting the document type definition D1 before conversion and the document type definition D2 in order to output a result according to the document type definition D2 after conversion. The process is complete once the document structure conversion S101 is performed for conversion of the "shaped" structure document F1 to a new structure document F3.

Document Conversion Program and Document Conversion System

The above-mentioned document conversion method can be achieved by a personal computer or workstation which a program described by an appropriate computer language is installed. In a case where such a document conversion program is installed to a computer, that computer functions as a document conversion system.

Figure 8:
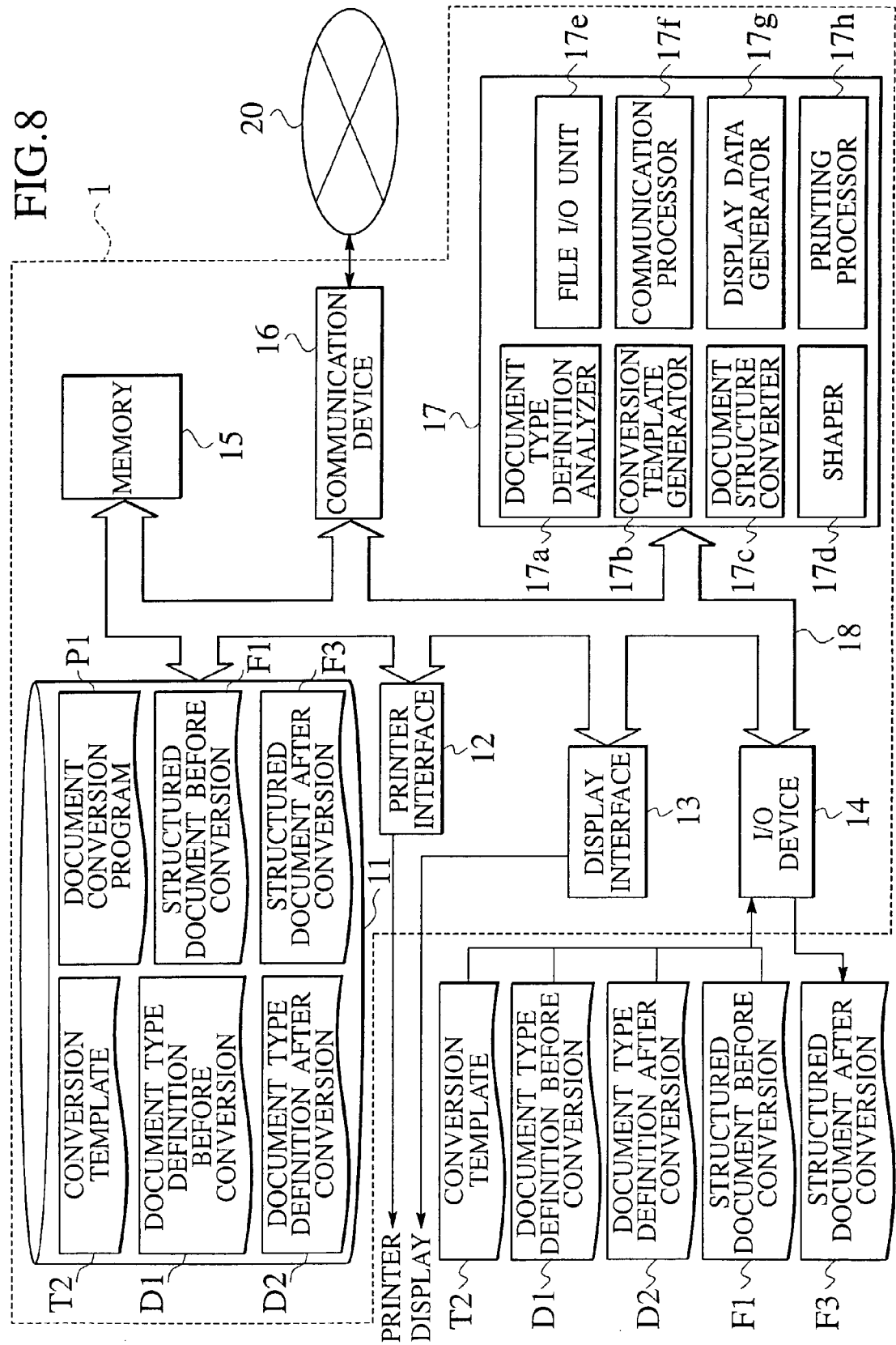
FIG. 8 is a block diagram showing the configuration of a computer which a document conversion program of the embodiment is installed.

FIG. 8 is a block diagram showing the configuration of a computer 1 in which the document conversion program is installed. As shown in the figure, the computer 1 comprises a hard disk 11, a printer interface 12, a display interface 13, an I/O device 14, a memory 15, a communication device 16, a CPU 17 and a bus 18 for connecting these devices, etc.

The hard disk 11 is a recording medium which stores various kinds of data. Various kinds of data read via the I/O device 14 is stored in the hard disk 11 and the data is outputted to the memory 15 or the CPU 17 according to a request by the CPU 17. Further, data, which is the result of processes in each device, is also stored in the hard disk 11. This hard disk 11 stores document conversion program P1 and the document conversion program P1 is activated and is controlled according to the control of the CPU 17.

The printer interface 12 is a device for connecting the computer 1 to an external printer, etc. and performs file printing depends on a request from the CPU 17, etc. The display interface 13 displays images based on display data generated by the CPU 17 and displays appropriate images for control of the document conversion program P1 or a result of various processes.

The communication device 16 is a communication unit such as LAN card or a modem, which connects the computer 1 to a communication network 20 such as the Internet, etc. via a communication line so as to transmit/receive data. The computer 1 is capable of receiving data from external terminal or transmitting converted document file through the communication device 16.

The I/O device 14 is a device for reading/writing data from/to an external recording medium, such as a flexible disk drive and a CD-ROM drive. According to this embodiment, the conversion template T2, the document type definitions D1, D2 and the structured documents F1/F3 are inputted/outputted.

The memory 15 is a main memory device for storing data temporarily when the CPU 17 executes process. The memory 15 holds data read out from the hard disk 11 or a result of processes executed by the CPU 17.

The CPU 17 is a central processing unit, which functions as a document type definition analyzer 17a, a conversion template generator 17b, a document structure converter 17c, a shaper 17d, a file I/O unit 17e, a communication processor 17f, a display data generator 17g and a printing processor 17h, by executing the document conversion program P1 read out from the hard disk 11.

The document type definition analyzer 17a analyzes the document type definition D1 and the document type definition after conversion, and extracts a difference between these document type definitions. According to this embodiment, this document type definition analyzer 17a comprises an identifier correspondence table storing unit for storing the identifier correspondence table which the identifier of the document type definition before conversion and the identifier of the document type definition after conversion are linked, a logical structure extracting unit for extracting a first logical structure defined by the identifier of the document type definition D1 as well as a second logical structure defined by the identifier of the document type definition D2, and a condition detector which compares the first logical structure with the second logical structure according to the identifier correspondence table and analyzes the condition based on differing portions between the both structures.

The identifier correspondence table storing unit can be achieved with a cache memory inside the CPU 17 and the hard disk 11 or the memory 15 can also be used as an auxiliary means.

The logical structure extracting unit reads data contained in the document type definitions D1 and D2 sequentially and verifies the data using identifiers described in the identifier correspondence table. In a case where a matching identifier is detected, the logical structure extracting unit extracts its pattern by referring to a logical structure existing below the identifier.

The condition detector compares rules specified for the document type definitions D1 and D2 before/after conversion so as to detect a condition which generates a difference.

For example, the condition detector detects a condition where a difference in pattern occurs if however many LI elements exist below the UL.

The conversion template generator 17b generates a conversion template T1 according to a result of the document type definition analyzer 17a. The conversion template T1 describes a conversion rule for the structured document F2 which is a result of the document conversion to avoid any contradictions to the document type definition D2. According to this embodiment, the conversion template generator 17b generates a conversion rule based on the aforementioned condition about the differing portions and its corresponding logical structure after conversion (pattern extracted from D2). The conversion template generator 17b then correlates the identifier correspondence table with the conversion rule and converts them to the format of the conversion template.

The document structure converter 17c processes the document conversion using the conversion template. The document structure converter replaces the identifiers described in the identifier correspondence table and converts the argument attached to the identifier. Further, the document structure converter 17c adds, deletes and converts the logical structure of an identifier which matches the aforementioned condition according to the template for replacing.

The shaper 17d shapes the first structured document F1 so as to enable conversion by the document structure converter 17c and corrects erroneous description in the structured document F1 (this is not required for a shaped document. e.g., XML). More specifically, the shaper 17d corrects the nest of the start tag and the end tag, and adds the end tag if the end tag is not already attached. Further, the shaper 17d inserts '/' if an empty element exists (e.g., :BR//), encloses an attribute value with double quotation, adds an attribute value if the attribute value has been omitted, corrects the element name and attribute name to small letters and so on.

The file I/O unit 17e controls input/output of a file and the operation of the hard disk 11 as well as I/O device 14. More specifically, the file I/O unit 17e reads the structured document F1, the conversion template T2, and the identifier correspondence table, etc. The file I/O unit 17e also stores the structured document F3 in the hard disk 11 and writes it into a flexible disk or a CD-R, etc. through the I/O device 14. Further, the file I/O unit 17e inputs or outputs each file to/from the communication processor 17f or printing processor 17h as required.

The communication processor 17f controls the communication device 16 and is connected to the network 20 through the communication device 16 so as to transmit/receive the structured document F1 and the structured document F3 to/from an external terminal. The communication processor 17f also receives a conversion request of a file from the other terminals through the communication device 16.

The display data generator 17g generates image data for displaying on a screen and controls the display interface 13. Image data is displayed on an external display unit through the display interface 13. This display data includes graphic data to be generated according to the document conversion program P1 and the display data is used to display an image for control of each process and a review of each file.

The printing processor 17h controls the printer interface 12 to print the structured document F3 by an external printer.

Operation

Figure 9:
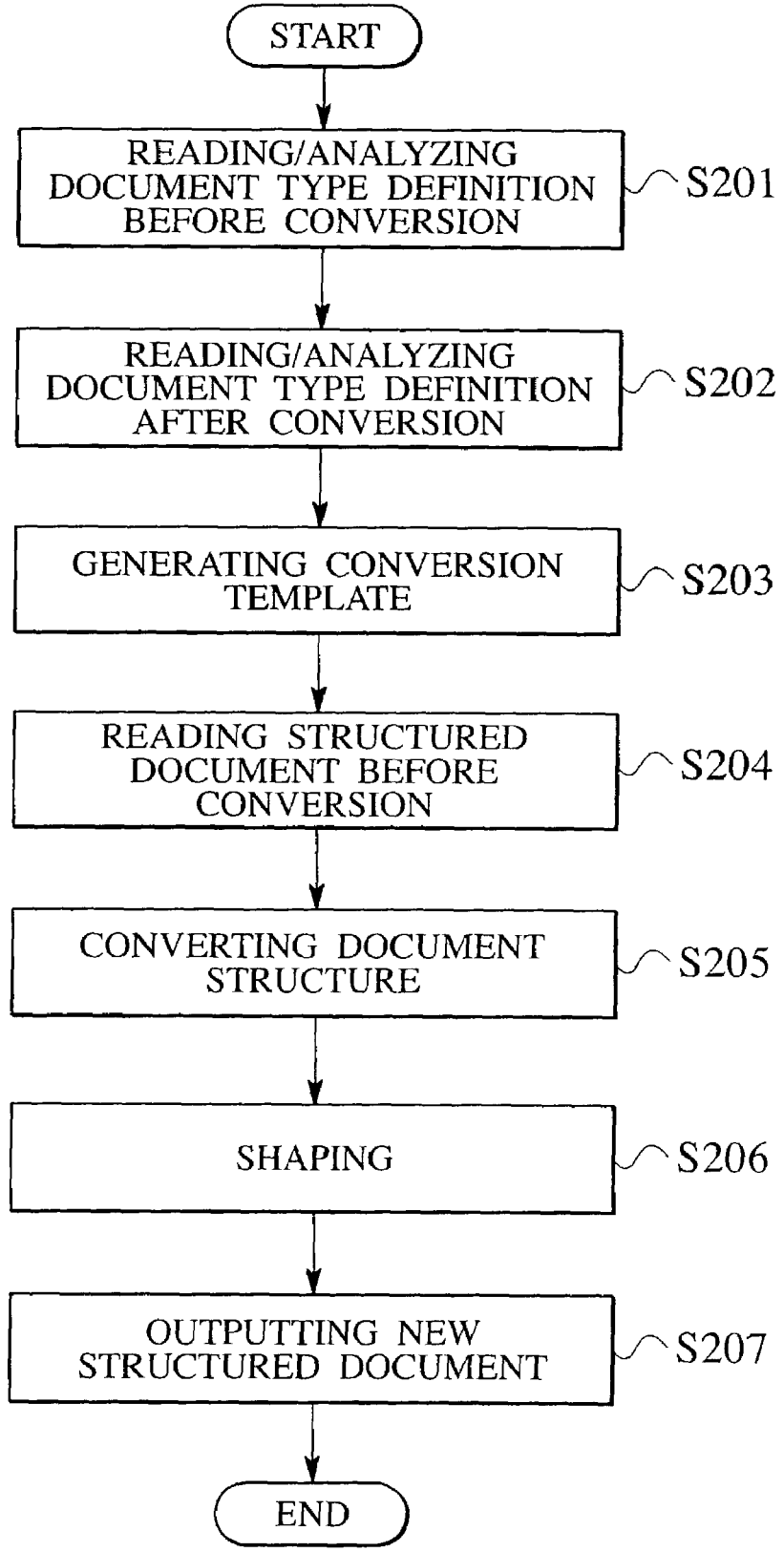
FIG. 9 is a flowchart showing process of the computer which the document conversion program of the embodiment is installed.

The document conversion system can be achieved by executing the document conversion program described above on a personal computer, etc. The operation of this document conversion system will be described with reference to FIG. 9. FIG. 9 is a flowchart showing the process of the document conversion system.

As shown in FIG. 9, the document type definition D1 before conversion is read out and analyzed (S201). More specifically, a file is read out from the I/O device 14 or the hard disk 11 and analyzed by the document type definition analyzer 17a. Similarly, the document type definition D2 after conversion is read out and analyzed (S202). After that, the conversion template is generated (S203). More specifically, the document type definition analyzer 17a analyzes the document type definition D1/D2 and extracts a difference between these document type definitions.

Next, the structured document F1 is read out (S204), the read-out structured document F1 is shaped (S205) if shaping is required and document structure of the shaped document is converted (S206).

Then, the converted structured document F3 is outputted (S207). This output includes writing it into the I/O device 14 or the hard disk 11, transmitting it to the network 20 through the communication device 16 and printing it out through the printer interface 13.

Computer Readable Recording Medium Storing Document Conversion Program

Figure 10:
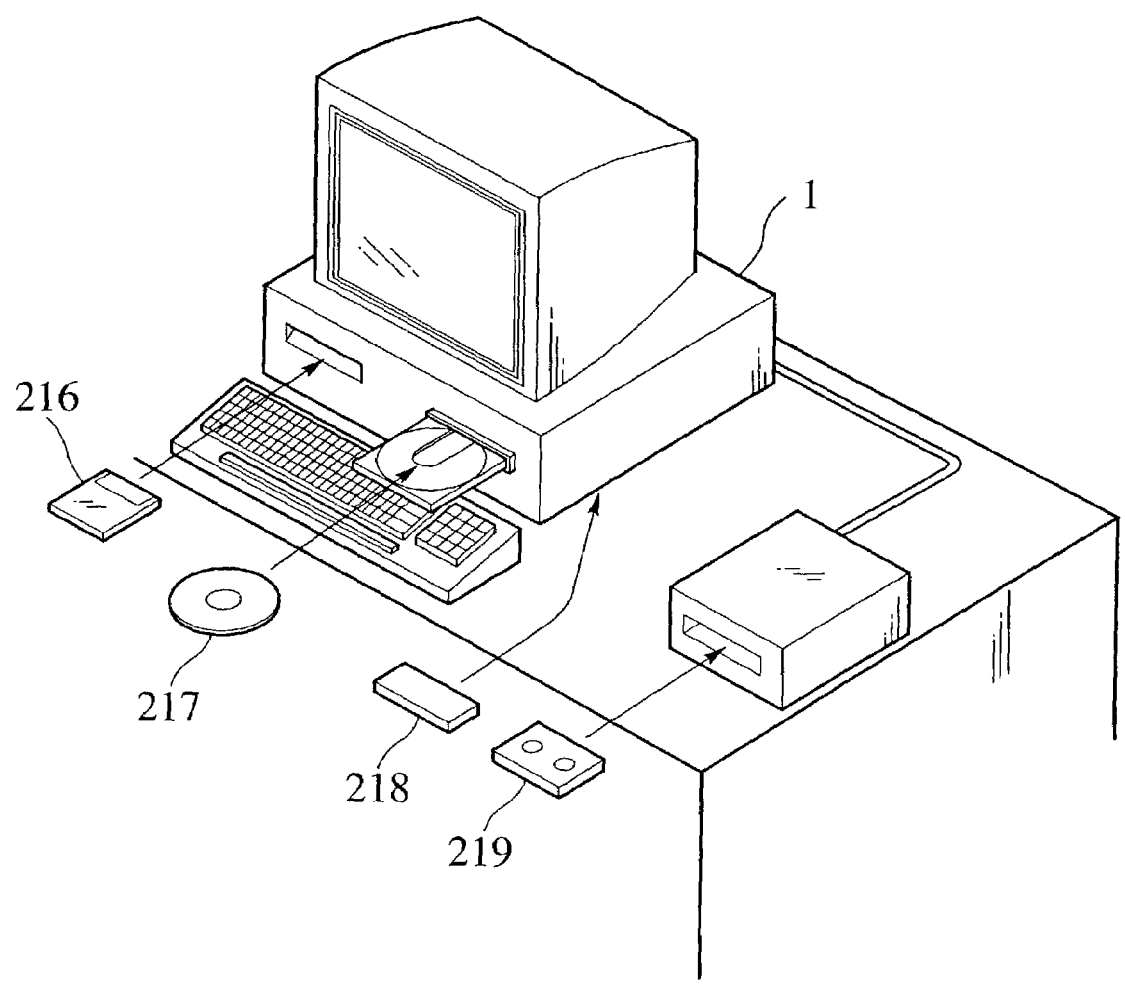
FIG. 10 is a perspective view showing a computer readable recording medium in which the document conversion program of the embodiment is stored.

The above described document conversion program can be stored in a recording medium readable by the computer 1. This computer readable recording medium includes, as shown in FIG. 10, a flexible disk 216, a CD-ROM 217, a ROM 218, a magnetic tape 219, etc.

Figure 11:
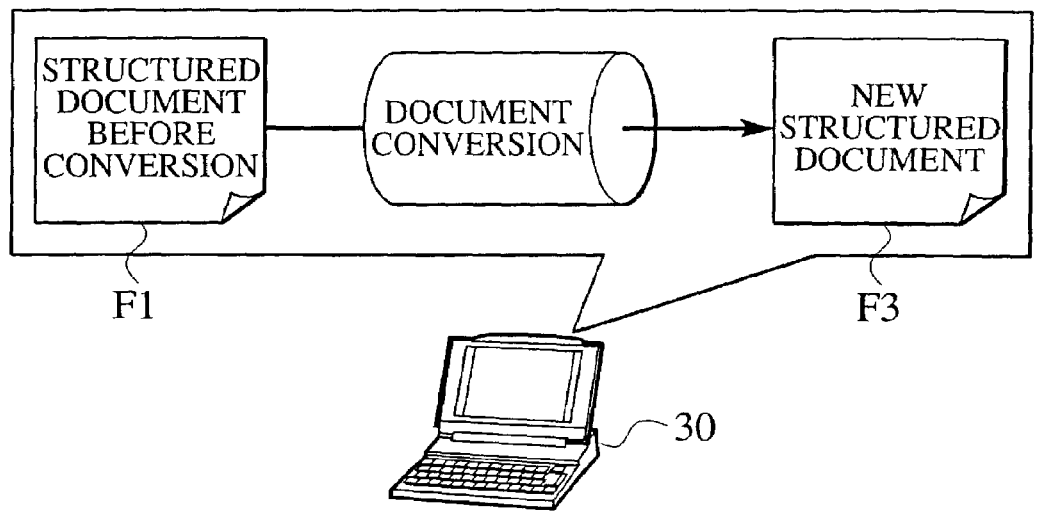
FIG. 11 is a schematic diagram showing the process of the computer which the document conversion program of the embodiment is installed.

As shown in FIG. 11, the computer readable recording medium storing such a document conversion program enables document conversion by using computer 30 such as a notebook type personal computer, a desk-top personal computer or a workstation.

For example, in a case where the structured document F1 which is to be converted is stored in a file as shown in FIG. 11, such a structured document stored in a local disk is converted by the computer 30 in which the above-described document conversion program is installed, as a document converter.

Although the above embodiment has been described about a case where both the hard disk 11 for storing the structured document F1, F3 and the CPU 17 for arithmetic operation, etc are incorporated in a single computer, the present invention is not restricted to this example. For example, the above-described respective devices can be decentralized on plural computers.

Figure 12:
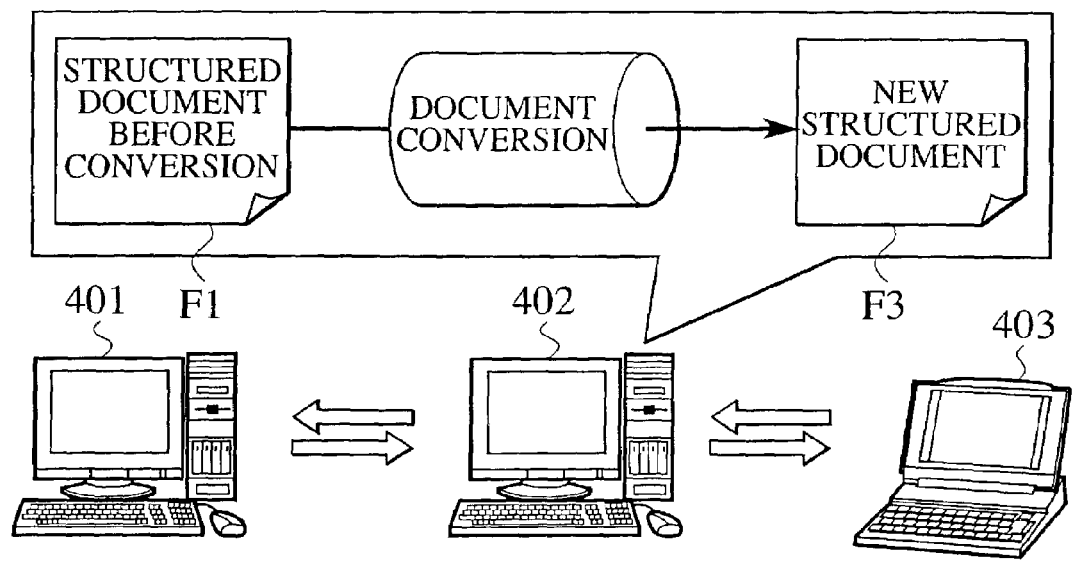
FIG. 12 is a schematic diagram showing the process of document conversion via a communication network using a computer in which the document conversion program of the embodiment is installed.

FIG. 12 is a schematic diagram showing a case where the above described respective devices are decentralized on plural computers. As shown in the figure, the structured document F1 which is to be converted is stored in a content server 401 which is connected to the World Wide Web (WWW). The structured document F1 can be converted by a conversion server 402 depend on a conversion request issued by a client terminal 403.

In this case, the conversion server 402 in which the above-described document conversion program is installed is utilized. The conversion server 402 is connected to the communication network (e.g., the Internet). The conversion server 402 comprises a receiving unit for receiving a conversion request from the client terminal 403 via the communication network and obtaining the structured document F1 from the content server 401. The conversion server 402 also comprises a transmitting unit for transmitting the structured document F3 after conversion to the client terminal device 403 via the communication network. The above-described communication device 16 can be used to function as the transmitting unit and the receiving unit.

As explained above, according to the present invention, since the validity verification step for document type definition after conversion is omitted by replacing with an appropriate conversion template in conversion of the structured document, a total time for the document structure conversion can be reduced.

The present invention has been described in detail by referring to the embodiments. It is obvious to those skilled in art that the present invention is not restricted to the embodiments mentioned above. The present invention may be carried out as a corrected or modified embodiment not departing from the gist and scope specified by the scope of claim for a patent. Therefore, the description of this specification aims at the representation of examples but does not have any limitation on the present invention.

What is claimed is:

1. A document conversion system for converting a first structured document conforming to a first document schema which defines a description method of a structured document into a second structured document conforming to a second document schema which differs from the first structured document, the first structured document having a first character string structure including a character string and a document tag adapted for sandwiching the character string, the document tag defining the character string as a prescribed element of the first structured document, the document conversion system comprising:
a correspondence table storing unit configured to store a correspondence table including at least the document tag, a conversion condition indicating whether or not the first character string structure needs to be converted, and a conversion content for converting the first character string structure to a second character string structure conformed to the second document schema;
a conversion template generator configured to generate a conversion template corresponding to a conversion method for a conversion of the first character string structure to the second character string structure based on the correspondence table; and
a document structure converter configured to convert the first character string structure to the second character string structure using the conversion template.

2. The document conversion system according to claim 1, further comprising a file recorder configured to store the first structured document and the second structured document as file data, wherein
the document structure converter converts the first structured document read out from the file recorder.

3. The document conversion system according to claim 1, further comprising:
a receiver which is connected to communication network and is configured to acquire a conversion request and the first structured document from the communication network; and
a transmitter for transmitting the second structured document converted by the document structure converter to the communication network.

4. The document conversion system according to claim 1, further comprising a shaper configured to shape the first structured document to a structure conforming to the first document schema in a case where a part of the first structured document does not correspond to the first document schema.

5. The document conversion method according to claim 1, wherein the conversion content template generator is configured to generate the conversion template based on an XSL, and
the document structure converter in configured to convert the first character string structure to the second character string structure by an XSLT conversion engine.

6. The document conversion system according to claim 1, wherein the conversion content includes a sandwiching of the character string by a div tag in a case where the character string cannot be correlated just after the document tag in the second structured document.

7. A document conversion method for converting a first structured document conforming to a first document schema which defines a description method of a structured method of a structured document into a second structured document conforming to a second document schema which differs from the first structured document, the first structured document having a first character string structure including a character string and a document tag adapted for sandwiching the character string, the document tag defining the character string as a prescribed element of the first structured document, the document conversion method comprising the steps of:
(A) generating a conversion template corresponding to a conversion method for a conversion of the first character string structure to the second character string structure based on the correspondence table including at least the document tag, a conversion condition indicating whether or not the first character string structure needs to be converted, and a conversion content for converting the first character string structure to a second character string structure conformed to the second document schema; and
(B) converting the first character string structure to the second character string structure using the conversion template.

8. The document conversion method according to claim 7, wherein
the first structured document and the second structured document are stored in a file recorder as file data, and
the first structured document read from the file recorder is converted.

9. The document conversion method according to claim 7 further comprising:
a step of acquiring a conversion request and the first structured document from communication network, and
a step of transmitting a converted second structured document to the communication network.

10. The document conversion method according to claim 7, wherein the step (B) includes a step of shaping the first structured document to a structure conforming to the first document schema in a case where a part of the first structured document does not correspond to the first document schema.

11. The document conversion method according to claim 7, wherein
in the step (A), the conversion template is generated based on an XSL, and
in the step (B), the first character string structure is converted to the second character string structure by an XSLT conversion engine.

12. The document conversion method according to claim 7, wherein
the conversion content includes sandwiching of the character string by a div tag in a case where the character string cannot be correlated just after the document tag in the second structured document.

13. A computer readable recording medium storing a document conversion program for converting a first structured document conforming to a first document schema defining a description method of a structured document into a second structured document conforming to a second document schema which differs from the first structured document,
   the first structured document having a first character string structure including a character string and a document tag adapted for sandwiching the character string, the document tag defining the character string as a prescribed element of the first structured document, said computer program product including instructions for:
   (A) generating a conversion template corresponding to a conversion method for a conversion of the first character string structure to the second character string structure based on the correspondence table including at least the document tag, a conversion condition indicating whether or not the first character string structure needs to be converted, and a conversion content for converting the first character string structure to a second character string structure conformed to the second document schema; and
   (B) converting the first character string structure to the second character structure using the conversion template.

14. The computer readable recording medium storing the document conversion program according to claim 13, wherein
   the first structured document and the second structured document are stored in a file recorder as file data, and the first structured document read from the file recorder is converted.

15. The computer readable recording medium storing the document conversion program according to claim 14 further comprising:
   a step of acquiring a conversion request and the first structured document from communication network, and
   a step of transmitting a converted second structured document to the communication network.

16. The computer readable recording medium storing the document conversion program according to claim 14, wherein the step (B) includes a step of shaping the first structured document to a structure conforming to the first document schema in a case where a part of the first structured document does not correspond to the first document schema.

17. The computer readable recording medium according to claim 13, wherein
   in the step (A), the conversion template is generated based on an XSL, and
   in the step (B), the first character string structure is converted to the second character string structure by an XSLT conversion engine.

18. The computer readable recording medium according to claim 13, wherein the conversion content includes sandwiching of the character string by a div tag in a case where the character string cannot be correlated just after the document tag in the second structured document.

* * * * *